United States Patent [19]
Wong

[11] Patent Number: 5,832,288
[45] Date of Patent: Nov. 3, 1998

[54] ELEMENT-SELECT MECHANISM FOR A VECTOR PROCESSOR

[75] Inventor: Roney S. Wong, Sunnyvale, Calif.

[73] Assignee: Samsung Electronics Co., Ltd., Rep. of Korea

[21] Appl. No.: 733,907

[22] Filed: Oct. 18, 1996

[51] Int. Cl.⁶ .................................................. G06F 15/00
[52] U.S. Cl. ...................................................... 395/800.05
[58] Field of Search ........................ 395/800.05, 800.04, 395/565

[56] References Cited

U.S. PATENT DOCUMENTS

| | | | |
|---|---|---|---|
| 4,490,786 | 12/1984 | Nakatani | 395/800.05 |
| 4,656,581 | 4/1987 | Ohwada | 395/800.05 |
| 4,881,168 | 11/1989 | Inagami et al. | 395/800.05 |
| 4,933,839 | 6/1990 | Kinoshita et al. | 395/800.08 |
| 5,513,366 | 4/1996 | Agarwal et al. | 395/800.22 |
| 5,651,121 | 7/1997 | Davies | 395/376 |

OTHER PUBLICATIONS

MC68030 User's Manual Second Edition; Move Multiple Registers instruction; pp. 3–120 through 3–122, 1989.

Krste Asanovic, et al., "The TO Vector Microprocessor", Hot Chips VII, Stanford, California, Aug. 14–15, 1995, pp. 187–196.

Memo from Prabir Mohanty to Y.C. Ahn, et al., "Intel MMX Technology", Samsung Electronics, San Jose, California, 7 Mar., 1996, 14 pages.

"i750®, i860™, i960® Processors and Related Products", Chapter 4, Intel Product Overview, 1992, 9 pages.

"Pentium Processor with MMX Technology", Intel, Jan. 1997, 54 pages.

*Primary Examiner*—Parshotam S. Lall
*Assistant Examiner*—Kenneth R. Coulter
*Attorney, Agent, or Firm*—Skjerven, Morrill, MacPherson Franklin, and Friel LLP; David T. Millers

[57] ABSTRACT

The present invention supports vector-processor instructions that allow a programmer to specify the size and location of a particular vector element stored in a vector register. A mask generator circuit includes a mask-selector circuit, an index circuit, and a left shifter. The mask-selector circuit decodes a portion of the vector instruction indicating vector-element size and selects a mask appropriate for selecting an element of that size. The index circuit decodes both the vector-size information and that portion of the vector instruction indicating the location of the particular vector element to be masked. The index circuit uses this information to determine the number of places (the "shift count") that the mask must be shifted to correspond to the selected vector element. The shifter, upon receiving the mask and the shift count, shifts the mask by the shift count and provides the resulting output signal to the vector processor. This output signal is then used to select only the vector element specified.

8 Claims, 5 Drawing Sheets

ELEMENT-SELECT MECHANISM FOR A VECTOR PROCESSOR

CROSS REFERENCE TO RELATED APPLICATION

The present document is related to U.S. Patent application Ser. No.08/733,906, filed Oct. 18, 1996, entitled "Computer Methods For Writing a Scalar Value to a Vector," by Heonchul Park, which is incorporated herein by reference.

BACKGROUND

Applications such as 3-D graphics, medical imaging, and scientific modeling require modern computers to perform vector operations. A typical vector operation might compare two 32-element vectors to obtain a single 32-element vector result. This and other vector operations greatly increase the speed performance of many applications by performing large numbers of similar operations in parallel.

Vector processors typically include a number of vector registers to support vector operations. FIG. 1 graphically depicts a conventional vector register 100. Vector register 100 includes thirty-two individually addressed bytes. Each byte includes eight bits, though other byte sizes may also be used. The bold outline of vector register 100 indicates that each of the specified addresses corresponds to a single vector byte address (e.g., eight bits, as indicated by the shadowed stack behind the listed addresses). Similar bold outlines in FIGS. 1 and 2 similarly specify single vector byte addresses that correspond to multiple bits.

Vector register 100 has a physical vector length of 32 bytes, and may be configured to support vector elements of various lengths. In the examples of FIG. 1, vector register 100 may be configured to store:

1. thirty-two bytes;
2. sixteen sixteen-bit halfwords; or
3. eight thirty-two bit words.

Larger elements offer more precision but decrease speed performance; smaller elements decrease precision but improve speed performance. Thus, the ability to support vectors of varying length allows software running on the vector processor to optimize a given operation for speed and precision.

It is sometimes desired to access (read from or write to) an individual element of a vector. For example, it may be necessary to write a value into a single vector element of a vector stored in vector register without changing the values stored in the remaining elements. Because write operations overwrite the entire vector, the contents of those vector elements that are to remain unchanged must be read before overwriting the contents of the single vector element; otherwise, the data stored in those vector elements not specified would be lost when writing the single vector element. Thus, a write operation to an individual vector element typically entails reading the contents of the vector register, modifying those contents to include the changed element, and writing the new vector into the register.

SUMMARY

While modern vector processors access individual vector elements very quickly, image processing and other data-intensive applications demand ever-increasing levels of speed performance. The present invention addresses this demand by eliminating the need to read a vector register to modify a single element, thereby increasing the speed at which a vector processor can write to or read from an individual vector element. In addition, the present invention may be adapted to access individual elements of varying length.

Vector processors used in conjunction with the present invention support one or more vector instructions with which a programmer may specify the size (in bits) and location of a particular vector element stored in a specified vector register. One such instruction, a vector insert instruction, allows a programmer to insert a new vector element into a selected vector element storage location in a vector register without reading the contents of the vector register.

A mask generator circuit in accordance with the present invention includes a mask-selector circuit, an index circuit, and a left shifter. The mask-selector circuit decodes that portion of the vector instruction indicating vector-element size and selects a digital mask appropriate for selecting an element of that size. The index circuit decodes both the vector-size information and that portion of the vector instruction indicating the location of the particular vector element to be masked. The index circuit uses this information to determine the number of places (the "shift count") that the mask selected by mask-selector circuit must be shifted by to correspond with the specified vector element. The shifter, upon receiving the mask and the shift count, shifts the mask by the shift count and provides the resulting output signal to the vector processor. This output signal is then used to select only the vector element specified; the remaining elements are neither read from nor written to the vector register.

A vector instruction in accordance with the present invention eliminates the need to read the contents of a vector register prior to writing a single vector element and, as a consequence, saves valuable processor time.

DETAILED DESCRIPTION

The present invention enables a vector processor to access individual elements of vectors stored within vector registers in only a single clock cycle, and further enables the vector processor to make use of vectors that include elements of various lengths. To accomplish this, a mask-generator circuit develops a mask appropriate for elements of a selected size and shifts the mask by an appropriate number of places to mask a specified vector element.

Figure 1:
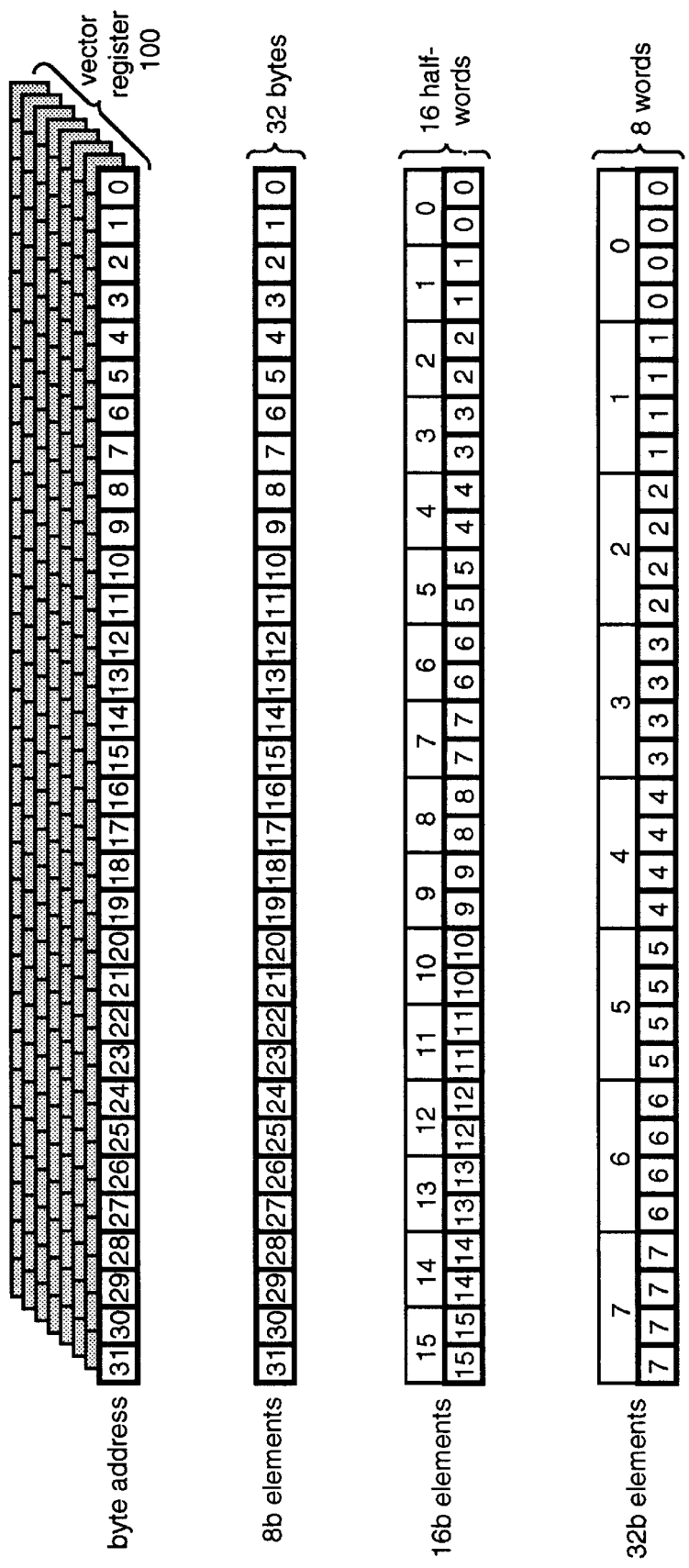
FIG. 1 depicts a conventional vector register 100.
Figure 2:
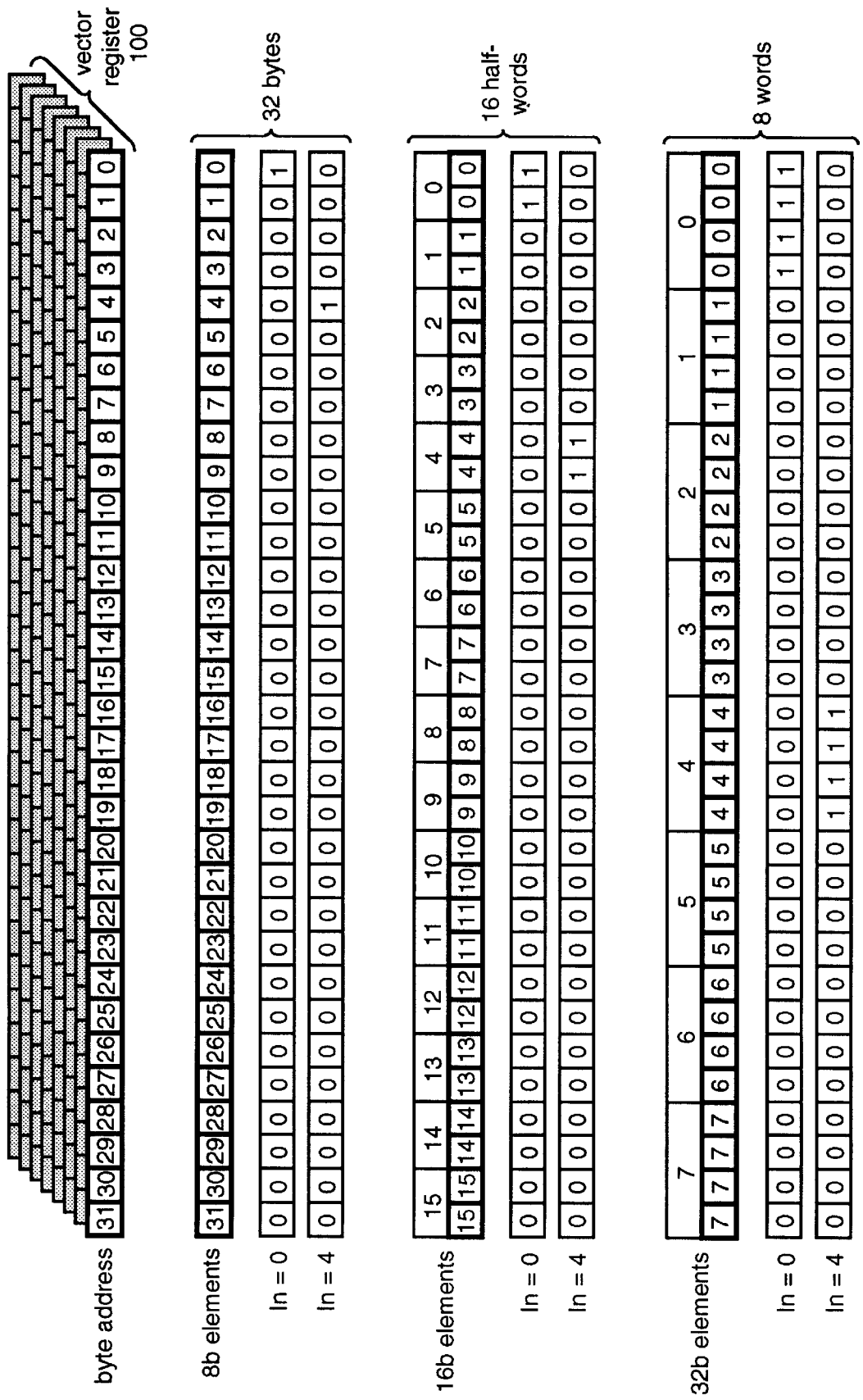
FIG. 2 depicts conventional vector register 100 and a number of thirty-two-bit masks used to access individual elements of vectors stored within vector register 100.

FIG. 2 (like FIG. 1) includes a graphical representation of vector register 100. FIG. 2 additionally includes a number of thirty-two-bit masks used to access individual elements of vectors stored within vector register 100. There is a single mask bit for each byte address of vector register 100.

Referring first to the 32-byte example of FIG. 2, the first mask is shown for an index of zero (In =0). As shown, that mask includes a series of stored signals indicative of logic zeros and a single stored signal indicative of a logic one. Signals indicative of logic zeros and logic ones (typically zero and five volts, respectively) are referred to hereinafter as logic zeros and logic ones for brevity.

The logic one of the first mask of FIG. 2 is stored in the mask location corresponding to the zeroth byte-address location. In the second 32-byte example, the index provided is four (In =4); consequently, the byte address corresponding to the fourth element of the vector is specified by a logic one located in the mask location corresponding to the fourth byte address location. This second mask is used in a manner similar to the first, but instead allows the vector processor to access the fourth eight-bit element of the 32-byte vector.

In the sixteen-halfword example of FIG. 2, vector register 100 stores a vector that includes sixteen halfword elements. Masks similar to those described above in connection with the 32-byte example are used to access individual elements within a sixteen-halfword vector. However, because each halfword element corresponds to a pair of byte addresses, a mask used to select a given halfword element includes an adjacent pair of logic ones. For example, a mask for selecting the zeroth halfword element of a sixteen-element vector includes logic ones in the mask bits corresponding to the zeroth and first byte address of vector register 100. As a further example, when the index is equal to four, the mask includes logic ones in the mask bits corresponding to byte addresses eight and nine, the combination of which addresses the fourth halfword element of a sixteen-element vector.

Finally, in the eight-word example of FIG. 2, each vector element includes thirty-two bits stored in four consecutive byte-address storage locations of vector register 100. Consequently, to mask an individual element of an eight-element vector, the mask includes four consecutive logic ones, each of which corresponds to one of the four adjacent byte addresses used to specify the selected 32-bit element.

The present invention creates the appropriate mask to specify individual elements within vectors of various lengths by specifying a unique mask for each vector length and by shifting that unique mask the appropriate number of byte addresses to mask a selected vector element. In the first example of FIG. 2, a mask including a single logic one is created and is left shifted the appropriated number of byte addresses to mask the selected 8-bit element. In the illustrated case where the selected element is stored in byte-address zero (i.e., when the index equals zero), the mask is "shifted" by zero (not shifted) and so masks the zeroth element of vector register 100. For an index of four, the logic one is shifted four places to the left to correspond to byte address four, and consequently with the fourth element of the 32-byte vector stored within vector register 100.

Sixteen-halfword vectors are treated similarly. However, the 32-bit mask begins with a string of 30 logic zeros followed by two logic ones in the least significant mask bits. This mask is then left shifted by twice the specified index. In the sixteen-halfword example of FIG. 2, the mask is left shifted by zero (not shifted) when the index is zero and is left shifted by eight byte addresses (four halfword elements) when the index is four.

The eight-word example of FIG. 2 is similar to the sixteen-halfword example, except that the right most 4-byte addresses store logic ones, and those logic ones are left shifted by a number of byte addresses equal to four times the specified index. In the example of FIG. 2, four adjacent logic ones are left shifted by sixteen byte addresses when the index is four.

While the present invention is described in connection with a 256-bit vector register having elements of eight, sixteen, or thirty-two bits, other vector sizes and other element sizes may be used. For example, one embodiment of the invention supports nine-bit elements in addition to eight, sixteen, and thirty-two bit elements.

Figure 3:
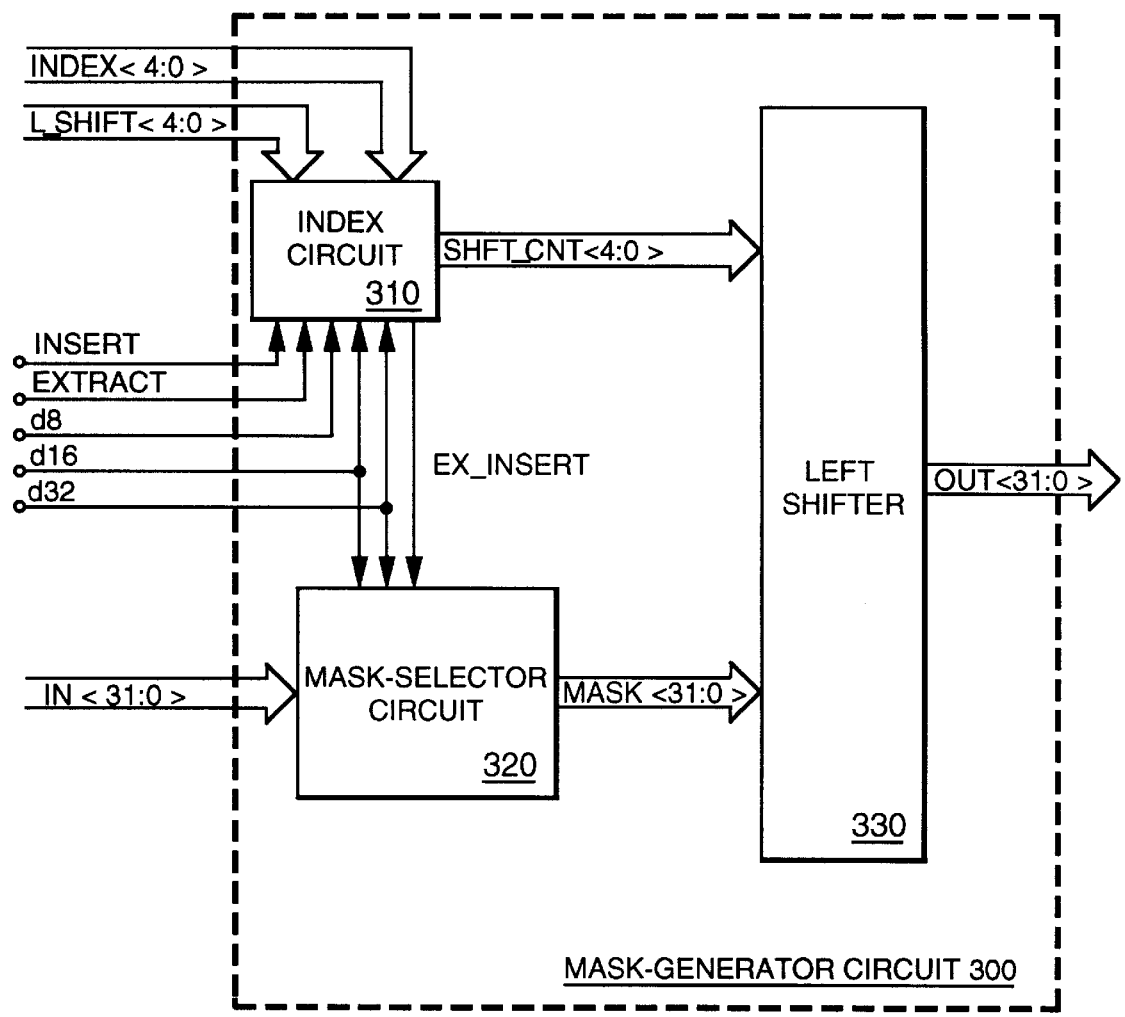
FIG. 3 is a block diagram of a mask generator circuit 300.

FIG. 3 is a block diagram of a mask generator circuit 300 that supports two modes of operation. The first is a "left-shift" mode in which circuit 300 functions as a conventional left shifter; the second is a "mask-generation" mode in which circuit 300 generates the appropriate mask for a selected element in a given vector stored within a vector register. Including the left-shift functionality into mask generator 300 saves valuable device area; however, the left-shift functionality is separate in other embodiments. Mask generator circuit 300 may also be configured to generate masks by shifting to the right.

Mask generator circuit 300 includes an index circuit 310, a mask-selector circuit 320, and a conventional left shifter 330. To support the left-shift mode, mask-selector circuit 320 receives a 32-bit input signal to be left shifted on an input bus IN<31:0> and index circuit 310 receives a five-bit number on a bus L—SHIFT<4:0> indicative of the number of places that the specified 32-bit signal is to be left shifted. In the left-shift mode, active when the signals on terminals INSERT and EXTRACT are indicative of logic zeros, index circuit 310 transfers the five-bit number on a bus L—SHIFT<4:0> to left shifter 330 on a shift-count bus SHFT—CNT<4:0>. Mask-selector circuit 320 similarly provides the input signal on the input bus IN<31:0> to left shifter 330 via a mask bus MASK<31:0>. Left shifter 330 provides the appropriate left shifted signal on a 32-bit output bus OUT<31:0>. In one embodiment, left shifter 330 is implemented as a conventional left-or-right shifter.

Figure 4:
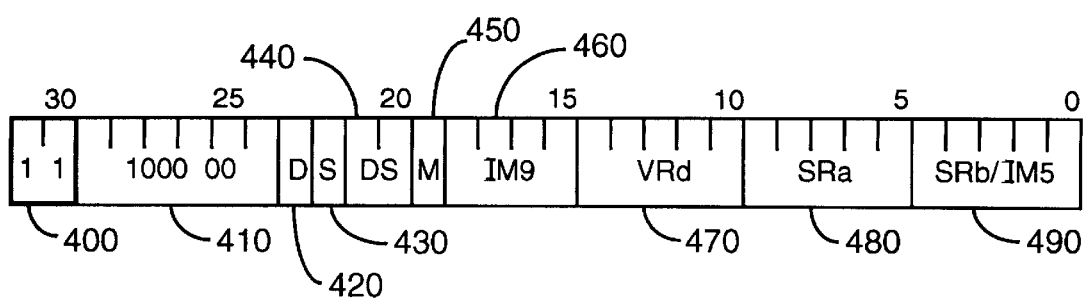
FIG. 4 depicts a vector-insert instruction VINSRT used to insert a single vector element into a vector location of vector register 100.

Circuit 300 operates in the mask-generator mode when the vector processor executes a vector instruction specifying an access to a selected element (specified by a five-bit index) within a selected vector register. The vector instruction also indicates the size of the element to be accessed and whether the access is an insert (write) or an extract (read) operation. One such vector instruction is the vector-insert instruction depicted in FIG. 4. That instruction, VINSRT, is used, in conjunction with mask-generator circuit 300, to insert a single element into a vector location.

VINSRT is a 32-bit instruction code composed of the following ten discrete fields:

1. a two-bit instruction type 400 that conventionally indicates which type of class the instructions belongs to;
2. a six-bit op-code 410 identifying the specific operation to be performed (in this case a vector insert);
3. a 1-bit destination scalar register flag 420 indicating whether the destination register of the instruction is of scalar or vector data type;
4. a one-bit scalar source register flag 430 indicating whether the source register is of scalar or vector data type;
5. a two-bit data-size flag 440 indicating the size of the element to be replaced in the vector;
6. a one-bit data size modifier 450 that, in combination with data-size flag 440, determines the encoding of operands of different data types;
7. a four-bit immediate field 460, used to store four bits of a nine-bit immediate value when combined with the five-bit source/immediate field 490;

8. a five-bit destination-register field 470 indicating the address of the register in which the result of the operation is to be stored;

9. a five-bit source field 480, used to store the address of a source register; and 10. a five-bit index field 490 for indicating the position in which to write into the vector.

For a detailed discussion of the vector instruction VINSRT, see the above-referenced patent application entitled "Computer Methods For Writing a Scalar Value to a Vector."

For the present explanation, the important fields of VINSRT are two-bit data-size flag 440 indicating the size of the element to be replaced in the vector and five-bit index field 490 indicating the position in which to write a source value into the vector. An index stored in index field 490 is presented to index circuit 310 on index bus INDEX<4:0> using conventional means. The vector processor decodes the element size indicated by data-size flag 440, using conventional logic, so that 1. terminal d8 is a logic one (e.g., 3.3 or 5 volts) only when the selected element size is eight bits, 2. terminal d16 is a logic one only when the selected element size is sixteen bits, and 3. terminal d32 is a logic one only when the selected element size is thirty-two bits.

Mask-selector circuit 320 and index circuit 310 decode the signals on terminals d8, d16, and d32. Finally, conventional logic (not shown) within the vector processor decodes op-code 410 to determine whether the operation is an insert or an extract and provides a logic one on the appropriate one of the respective INSERT and EXTRACT terminals.

Using the information derived from the vector instruction, mask-selector circuit 320 generates a mask, as described above in connection with FIG. 2, having either one, two, or four logic ones in the least-significant mask bits. Mask-selector circuit 320 then presents the mask as a 32-bit mask signal to left shifter 330 via mask bus MASK<31:0>. Also using the information derived from the vector instruction, index circuit 310 generates a signal on shift-count bus SHFT—CNT<4:0> indicative of the number of byte addresses that the mask signal must be shifted to select the requested vector element. Left shifter 330 then shifts the mask signal on mask bus MASK<31:0> by the number indicated by the signal on shift-count bus SHFT—CNT<4:0>.

Figure 5:
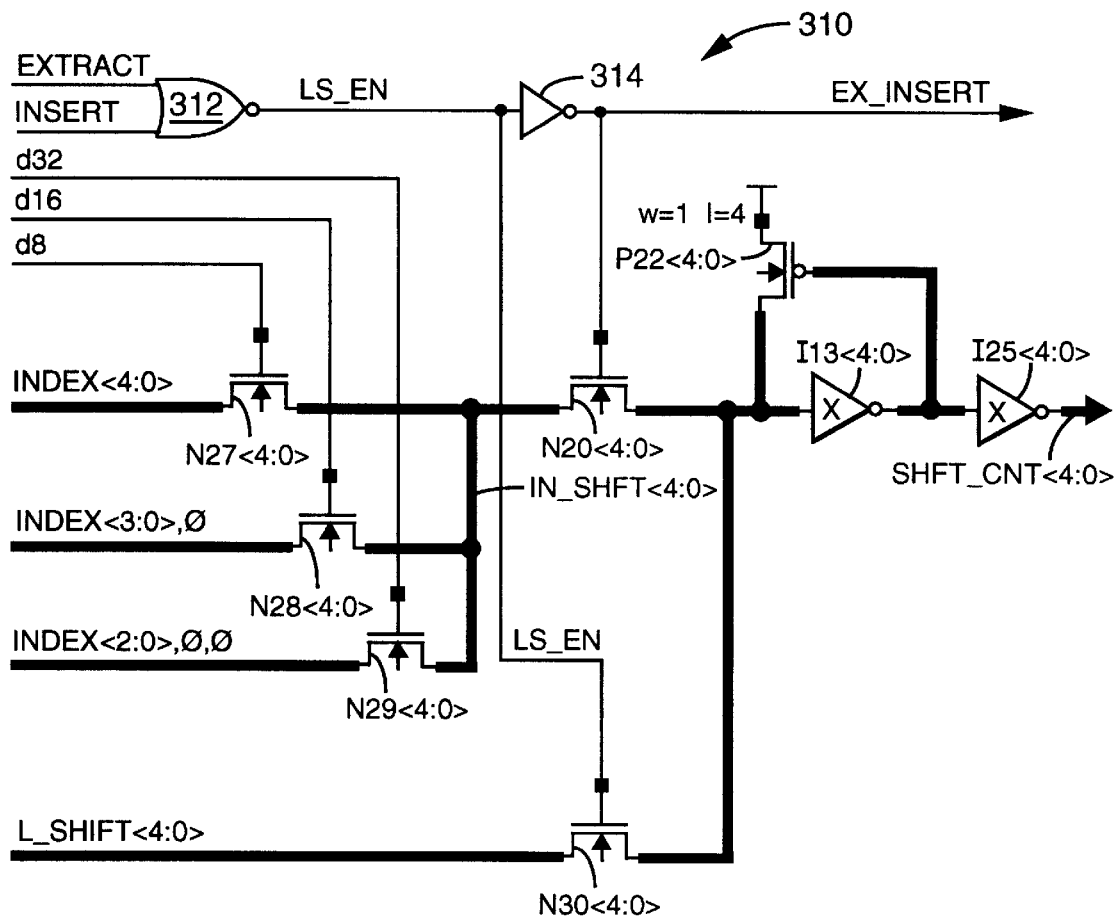
FIG. 5 is a schematic diagram of an index circuit 310.

FIG. 5 is a schematic diagram of index circuit 310. Index circuit 310 includes a NOR gate 312 and an inverter 314. Each of the remaining components illustrated in FIG. 5 is actually five similar components in parallel, as indicated by the <4:0> following each component designation. These parallel components support a five-line bus structure. The parallel components include transistors N27, N28, N29, N20, N30, P22, and inverters I13 and I25. Transistors designated with a "P" are p-type, and transistors with an "N" are n-type.

As discussed above, when mask generator circuit 300 functions as a conventional left shifter the input levels on terminal extract and insert are logic zero. As a result, the output of NOR gate 312, provided on left-shift enable line LS—EN, is a logic one. Inverter 314 inverts this logic one and consequently provides a logic zero to transistors N20 via line EX—INSERT. The logic one on line LS—EN turns transistors N30 on, gating the logic levels on bus L—SHIFT<4:0> to the input terminals of inverters I13. (Transistors N20 are turned off to prevent bus contention.) The logic levels on bus L—SHIFT<4:0> are inverted and latched by inverters I13 and transistors P22 before being inverted again by inverters I25. Thus, the signals on bus L—SHIFT<4:0> are latched and provided on shift-count bus SHFT—CNT<4:0>.

In the mask-generation mode, whether inserting or extracting data from a vector element, one input to NOR gate 312 is a logic one; consequently, the signal on line LS—EN is a logic zero, turning off transistors N30, and the signal on line EX—INSERT is a logic one, turning on transistors N20. Hence, shift-count bus SHFT—CNT<4:0> is coupled to index-shift bus IN—SHFT<4:0> and electrically isolated from left-shift bus L—SHIFT<4:0>. Transistors N27, N28, and N29 then act as a multiplexer to select from one of three buses, the bus selected depending upon which of terminals d8, d16, and d32 is at a voltage level indicative of a logic one.

A logic one on terminal d8 turns transistors N27 on and transistors N28 and N29 off to gate the index specified on index lines bus INDEX<4:0>to index-shift bus IN—SHFT<4:0>. Thus configured, index circuit 310 provides the index number, unchanged, on the shift-count bus SHFT—CNT<4:0>. This is appropriate, for the index indicates the correct number of address bytes to shift the mask when a vector is divided into eight-bit elements (see the first example of FIG. 2).

When vector register 100 is configured to store sixteen-bit elements, the signal on terminal d16 is a logic one and signals on terms d32 and d8 are logic zeros. Consequently, transistors N28 are on and transistors N27 and N29 are off. The input terminals of transistors N28 are connected to respective lines of a five-line bus that includes, in order of significance, index lines INDEX<3:0> and a logic zero. Adding the logic zero in the least-significant place shifts the index left by one. In binary mathematics, shifting left by one is equivalent to multiplying by two; thus, the five-bit signal passed through transistors N28 and inverters I12 and I25 represents the index number on bus INDEX<4:0> multiplied by two. This is appropriate when a vector is divided into sixteen-bit elements because, as shown in the second example of FIG. 2, the mask is shifted left by a number of address bytes equal to twice the index to mask the appropriate sixteen-bit element. The four index lines INDEX<3:0> are sufficient to identify each of the sixteen possible vector elements.

Finally, when the logic level on terminal d32 is a one (and the logic levels on terminals d16 and d8 are zero), the input terminals of transistors N29 are connected to respective terminals of a five-line bus that includes, in order of significance, index lines INDEX<2:0> and a pair of logic zeros. Adding two logic zeros into the two least-significant places shifts the index left by two, which multiplies the index by four. This is appropriate when a vector is divided into 32-bit elements because the mask is shifted left by a number equal to four times the index. The three index lines INDEX<2:0> are sufficient to identify each of the eight possible vector elements.

Figure 6:
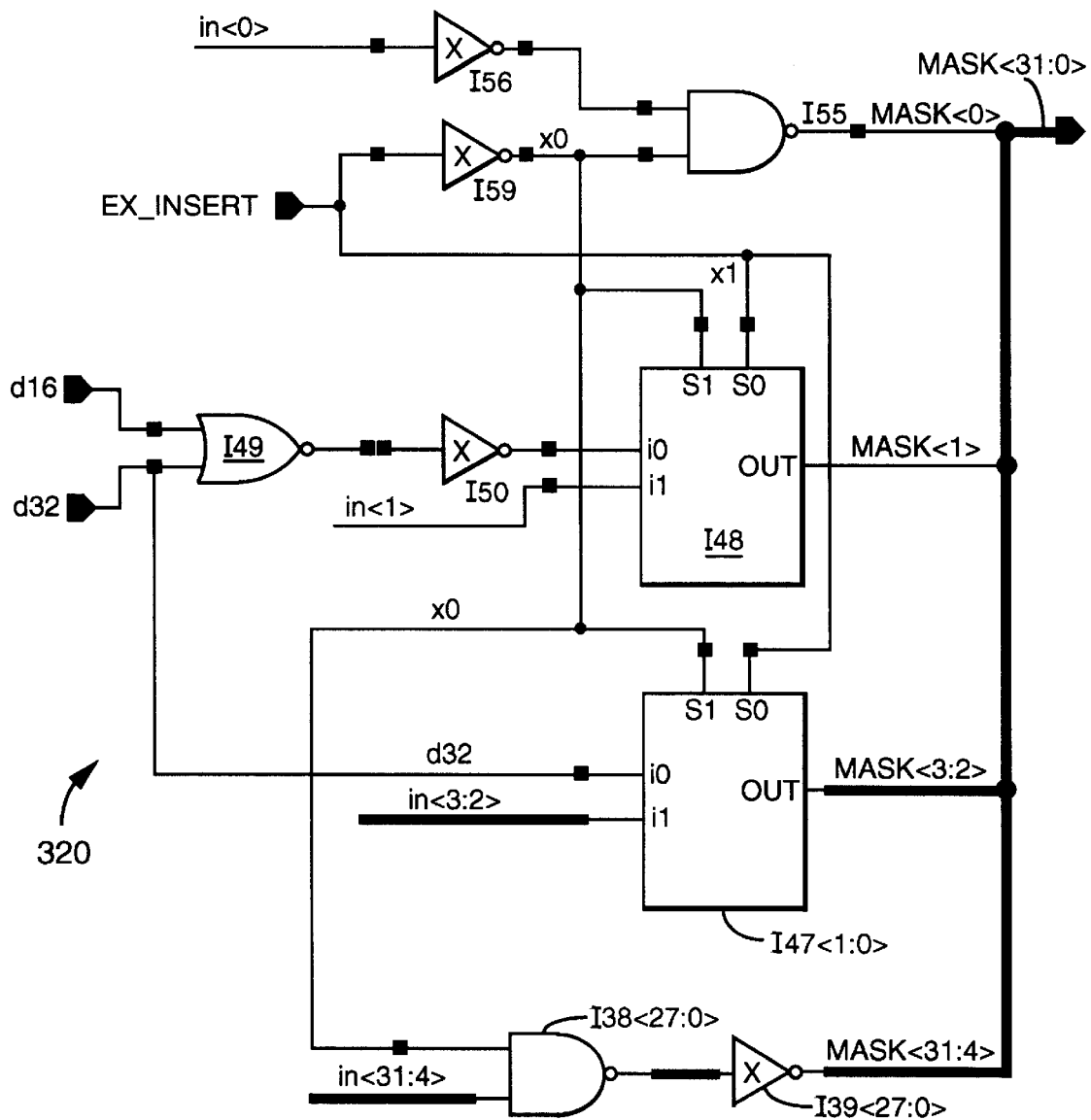
FIG. 6 is a schematic diagram of a mask-selector circuit 320.

FIG. 6 is a schematic diagram of mask-selector circuit 320. In the left-shift mode the voltage level on extract/insert line EX—INSERT represents a logic zero. An inverter I59 inverts this logic zero to a logic one so that a NAND gate I55 provides the signal on the least-significant bit IN<0> of the input bus to the least significant bit of mask bus MASK<0>. The inverted extract/insert signal on terminal EX—INSERT also enables multiplexers I48 and I47 to select line IN<1> and lines IN<3:2> to provide corresponding signals on respective mask lines MASK<3:1> of the mask bus. Finally, the inverted extract/insert signal on terminal EX—INSERT enables NAND gates I38 and inverters I39 to pass the signals on the remaining lines IN<31:4> of the input bus to respective mask lines MASK<31:4>. As a result, the 32-bit output signal on mask bus MASK<31:0> is identical to the 32-bit input signal on input bus IN<31:0>.

In the mask mode, mask-selector circuit 320 selects a mask appropriate to the indicated vector-element size. In the first example of FIG. 2, in which the element size is eight bits, the mask is a 32-bit mask with the bit corresponding to the leastsignificant byte address set to a logic one. In the second and third examples, either the two or the four least-significant bits of the 32-bit mask are set to logic one, depending upon the element size specified in the vector instruction initiating the mask operation.

Mask generator circuit 300 generates a vector mask each time the extract/insert signal on extract/insert line EX—INSERT represents a logic one. This logic one, inverted by inverter I59, disables NAND gate I55 so that mask line MASK<0> is held at a logic one. If an 8-bit byte size is selected, then the signals on d16 and d32 are each a logic zero. Consequently, each of multiplexers I48 and I47 pass logic zeros to mask lines MASK<1> and MASK<3:2>, respectively. The inverted extract/insert signal also disables NAND gate I38 so that mask lines MASK<31:4> are held at logic zero. Thus, when 8-bit vector elements are specified, the mask output on mask bus MASK<31:0> is a 32-bit signal representing a string of consecutive logic zeros followed by a single logic one in the least significant location.

The operation of mask-selector circuit 320 when sixteen-bit elements are selected, as indicated by a logic one on terminal d16, is similar to the operation of mask-selector circuit 320 when eight-bit elements are selected. However, the logic one on terminal d16, applied through NOR gate I49 and inverter I50 to multiplexer I48, is output on mask line MASK<1>. Hence, when sixteen-bit elements are selected, the output signal on the mask bus is a 32-bit signal having voltage levels representing logic ones on the two least-significant bits, MASK<1:0>, of the mask bus; the remaining bits are held at logic zero.

Finally, when 32-bit elements are selected (as indicated by a logic one on terminal d32), the logic one on d32 is output via multiplexers I47 onto mask lines MASK<3:2>. As when eight-bit and sixteen-bit elements are selected, mask lines MASK<1:0> are also held at logic one. Hence, when 32-bit elements are selected in the extract/insert mode, mask-selector circuit 320 outputs a 32-bit signal having voltage levels indicative of logic ones on each of the four least-significant bits MASK<3:0> of the mask bus; the remaining bits have voltage levels representative of logic zeros.

Although the present invention is described in connection with certain preferred embodiments for instructional purposes, other versions are possible. For example, while the foregoing examples illustrate 256-bit vectors having elements of eight, sixteen, or thirty-two bits, other vector sizes and other element sizes may be used. Moreover, while mask bits in the foregoing examples select particular vector elements by storing logic ones, other embodiments select particular vector elements by storing logic zeros. These and other modifications, adaptations, and combinations of various features of the described embodiments can be practices without departing from the scope of the invention as set forth in the claims.

What is claimed is:

1. A method of selecting one of a plurality of vector elements stored as a vector within a vector register, wherein each of the vector elements includes at least one multi-bit byte of data, and wherein each of the vector elements is stored at a unique location in the vector register, the method comprising:

receiving a vector instruction indicating the location and the number of bytes of one of the plurality of vector elements in the vector register;

generating a mask configured to select the one of the plurality of vector elements, wherein generating the mask comprises setting a mask bit for each of the number of bytes in the vector element and shifting the set mask bit by a shift count derived from the location indicated by the vector instruction; and accessing the selected vector element, using the mask, without accessing the non-selected vector elements.

2. A method of selecting one of a plurality of vector elements stored as a vector within a vector register, wherein each of the vector elements includes at least one multi-bit byte of data, and wherein each of the vector elements is stored at a unique location in the vector register, the method comprising:

receiving a vector instruction indicating the location and the number of bytes of one of the plurality of vector elements in the vector register;

generating a mask configured to select the one of the plurality of vector elements; and accessing the selected vector element, using the mask, without accessing the non-selected vector elements, wherein accessing the selected vector element includes writing new information into the location of the vector register including the vector element without writing to the non-selected vector element locations within the vector register.

3. A method of selecting one of a plurality of vector elements stored as a vector within a vector register, wherein each of the vector elements includes at least one multi-bit byte of data, and wherein each of the vector elements is stored at a unique location in the vector register, the method comprising:

receiving a vector instruction indicating the location and the number of bytes of one of the plurality of vector elements in the vector register;

generating a mask configured to select the one of the plurality of vector elements; and accessing the selected vector element, using the mask, without accessing the non-selected vector elements, wherein accessing the selected vector element includes reading information from the location of the vector register including the vector element without reading from the non-selected vector element locations within the vector register.

4. A system for selecting one of a plurality of vector elements, the system comprising:

a vector register configured to store a plurality of vector elements, wherein each vector element includes a number of bits;

means for determining the number of bits included in each vector element;

means for providing a mask having at least one mask bit for each of the vector elements in the vector register; and;

means for accessing the selected vector element, using the mask, without accessing the non-selected vector elements.

5. A mask-generator circuit for selecting one of a plurality of multi-bit vector elements stored within a vector register, the mask-generator circuit comprising:

a mask-selector circuit including:

a mask-selector input terminal configured to receive data indicative of the number of bits of each vector element; and a mask circuit having a plurality of mask bits, there being at least one mask bit for each of the vector elements in the vector register;

wherein the mask-selector circuit is configured to provide element-select data on at least one mask bit; and an index circuit having a first input bus configured to receive an index number, an input terminal configured to receive the data, and a shift-count output bus, the index circuit configured to provide a shift-count signal indicative of the number of places to shift the element-select data to select the one of the plurality of multi-bit vector elements.

6. The mask-generator circuit of claim 5, further comprising:

a shifter having a first shifter-input bus connected to the shift-count bus and a second shifter-input bus connected to the mask bus, the shifter configured to shift the stored mask signal on the mask bus by the shift-count specified on the shift-count bus.

7. A method for executing a single instruction in a processor to accesses a selected element of a vector stored in a vector register, the method comprising:

decoding the instruction to determine a specific number of storage locations required to store the selected element, a relative location of the selected element within the vector, and a type of access of the selected element;

generating a mask that identifies which one or more storage locations in the vector register correspond to the selected element, the mask identifying the number of storage location determined from decoding the instruction; and accessing the one or more storage locations identified by the mask without accessing storage locations that are in the vector register and not identified by the mask.

8. The method of claim 7, wherein generating the mask comprises:

setting bits in the mask wherein bits set in the mask correspond to the number of storage locations determined from the instruction; and shifting bits of the mask so that the bits set in mask at positions corresponding to the relative location determined from the instruction.

* * * * *